United States Patent
Hansen (10) Patent No.: US 6,325,926 B1
(45) Date of Patent: Dec. 4, 2001

(54) LIQUID TREATMENT APPARATUS

(75) Inventor: Austin C. Hansen, Atlanta, GA (US)

(73) Assignee: Austin Hansen, Atlanta, GA (US)

( * ) Notice: Subject to any disclaimer, the term of this patent is extended or adjusted under 35 U.S.C. 154(b) by 0 days.

(21) Appl. No.: 09/454,270

(22) Filed: Dec. 3, 1999

Related U.S. Application Data (63) Continuation-in-part of application No. 09/442,935, filed on Nov. 18, 1999.

(51) Int. Cl.$^7$ .............................. C02F 5/08; B01D 11/02
(52) U.S. Cl. .................. 210/209; 210/206; 210/198.1; 422/264; 422/275; 422/277; 422/278; 137/268
(58) Field of Search ............................. 210/198.1, 206, 210/209; 422/264, 275, 277, 278; 137/268

(56) References Cited

U.S. PATENT DOCUMENTS

| | | |
|---|---|---|
| 1,252,872 | 1/1918 | Yoggerst et al. . |
| 2,135,932 | 11/1938 | Belmont . |
| 2,801,751 * | 8/1957 | Thomas . |
| 2,955,923 | 10/1960 | Atkinson . |
| 3,000,505 * | 9/1961 | Scavuzzo . |
| 3,289,847 * | 12/1966 | Rothemund . |
| 3,306,709 | 2/1967 | Atkinson . |
| 3,442,800 | 5/1969 | Jasionowski . |
| 3,443,590 | 5/1969 | Wagner et al. . |
| 3,476,137 | 11/1969 | Eisendrath . |
| 3,887,468 | 6/1975 | Bray ...................................... 210/206 |
| 3,950,251 * | 4/1976 | Hiller . |
| 4,046,692 * | 9/1977 | Braukmann et al. . |
| 4,059,522 | 11/1977 | Polley et al. ..................... 210/198 R |
| 4,347,224 | 8/1982 | Beckert et al. . |
| 4,504,387 * | 3/1985 | LeMine et al. . |
| 4,531,659 | 7/1985 | Wright . |
| 4,780,197 | 10/1988 | Schuman .............................. 210/136 |
| 5,053,206 | 10/1991 | Maglio et al. . |
| 5,104,537 * | 4/1992 | Stifelman et al. . |
| 5,106,501 * | 4/1992 | Yang et al. . |
| 5,181,533 | 1/1993 | Kooi . |
| 5,443,569 | 8/1995 | Uehira et al. . |
| 5,462,208 | 10/1995 | Stahley et al. . |
| 5,507,945 | 4/1996 | Hansen . |
| 5,580,448 | 12/1996 | Brandreth, III ...................... 210/206 |
| 5,897,770 * | 4/1999 | Hatch et al. . |
| 6,096,197 * | 8/2000 | Hughes . |
| 6,117,332 * | 9/2000 | Hatch et al. . |

* cited by examiner

Primary Examiner—Thomas M. Lithgow
(74) Attorney, Agent, or Firm—Fitch, Even, Tabin & Flannery (57) ABSTRACT

A dispense device includes a dispense head and threaded canister. A chemical container assembly disposed within the canister includes a support tube which telescopically receives a chemical container. The chemical container includes inlet and outlet holes to allow a flow through the container to come into contact and subsequently dissolve chemical treatment material disposed within the container. The support tube engages the dispense head to aid in defining the separation distance between the dispense head and the outlet hole of the chemical container. A chemical sleeve disposed about the support column treats fluid passing through said chemical container.

10 Claims, 9 Drawing Sheets

LIQUID TREATMENT APPARATUS

This is a continuation-in-part of prior application Ser. No. 09/442,935, filed Nov. 18, 1999, pending, which is hereby incorporated herein by reference in its entirety.

BACKGROUND OF THE INVENTION

1. Field of the Invention

The present invention pertains to the beneficial treatment of liquids, such as water for food processing and other uses, and in particular to such treatments carried out in multiple stages.

2. Description of the Related Art

Many commercial and resiential water supplies suffer from "hard water" and other objectionable conditions. Oftentimes, remedial measures are implemented with the addition of chemical treatments to the water supply. In order to provide effective treatment and to prevent other problems from occurring, it may be necessary to carefully meter the amount of chemical treatment agent to a given quantity of supplied water.

A liquid treatment apparatus as described in commonly assigned U.S. Pat. No. 5,507,945 has proven commercially successful, particularly in the treatment of water supplies used for food preparation and other applications. The liquid treatment apparatus provides a chemical treatment agent which is put into solution and mixed with water flowing through the apparatus. More particularly, the liquid treatment apparatus includes a dispense head which develops a venturi action which is applied so as to help meter relatively small amounts of treatment chemical in the fluid flow. The liquid treatment apparatus includes, in addition to the aforementioned dispense head, a canister which threadingly engages the dispense head and which receives a container holding the chemical agent. The dispense head is typically joined to a piping system and has means for attachment to a mounting bracket if additional support is required. In operation, the canister is unthreaded from the dispensing head to allow replenishment of the chemical treating agent, as may be required. While the chemical treatment apparatus has been met with widespread commercial acceptance, it is desirable to provide low cost alternative systems which can be made operational by a simple retrofit to existing equipment, such as pre-filter housings, which are easily implemented by operators who are not familiar with dispenser and fluid metering technologies.

U.S. Pat. No. 5,580,448 discloses a chemical dispenser having a cartridge, used either alone or with an outer surrounding filter sleeve. The cartridge includes an apertured mid-section located between an upper solid wall conduit segment and a lower chemical-containing cartridge member which includes a dispensing aperture at its upper end. Thus, the amount of chemical treatment agent which can be provided, is reduced by the amount of the combined volume of the solid wall conduit segment and the apertured mid-section.

In various types of commercial activities, such as produce handling, food stores and restaurants, the available domestic water supply is employed to carry out commercial operations. Remedial measures to address problems of corrosion and scaling, are sometimes carried out with the introduction of small amounts of a treatment chemical, such as polyphosphate or sodium silicate, into the domestic water supply. Operators of the commercial establishments may not have the time or training required to appreciate the subtle operations of the chemical dispensing systems which are relied upon to control various water supply problems. It is advantageous to provide water treatment apparatus which is readily understood and easily maintained by operators of commercial establishments and other members of the community requiring water treatment.

SUMMARY OF THE INVENTION

It is an object of the present invention to provide chemical treatment apparatus for introducing relatively small amounts of a treatment chemical into a liquid supply.

Another object of the present invention is to provide a liquid treatment apparatus of the type which meters a treatment chemical into a liquid flow.

A further object of the present invention is to provide liquid treatment apparatus which can be integrated with a conventional plumbing system to meter a treatment chemical into a domestic water supply delivered by the plumbing system.

Yet another object of the present invention is to provide liquid treatment apparatus of the above-described type which employs a simplified dispense head of the pre-filter type, which does not employ venturi flow effects.

Yet another object of the present invention is to provide apparatus for retrofitting existing pre-filter housings so as to provide a chemical treatment either alone or in combination with the pre-filter elements.

These and other objects of the present invention are provided in a dispensing device for dispensing a chemical agent into a fluid flow, comprising:

- a dispense head having inlet and outlet means for coupling to said fluid flow and defining a flow passageway coupling said inlet and said outlet means;
- a canister engageable with said dispense head and defining a hollow interior cavity;
- said flow passageway in said dispense head including flow entry means for directing fluid flow into said hollow interior cavity and flow exit means for directing fluid flow out of said hollow interior cavity;
- a chemical container assembly within said hollow interior cavity in contact with the fluid flow; and
- said chemical container assembly including a rigid, hollow, pretreatment stage extending to said flow exit means, and a chemical container disposed in said support tube so as to be held by said support tube a predetermined spaced distance from said flow exit means.

DETAILED DESCRIPTION OF THE PREFERRED EMBODIMENTS

Referring now to FIGS. 1–5, a dispensing device according to principles of the present invention is generally indicated at 10. The dispensing device 10 comprises a fluid-tight, preferably pressure-tight vessel comprising a dispense head 12 and a sump or canister 14. As can be seen, for example in FIG. 3, a dispense head and canister have interfitting threaded portions 16, 18, respectively. A conventional O-ring seal 20 is the preferred mode of providing leak-free joinder of the dispense head and canister.

Figure 2:
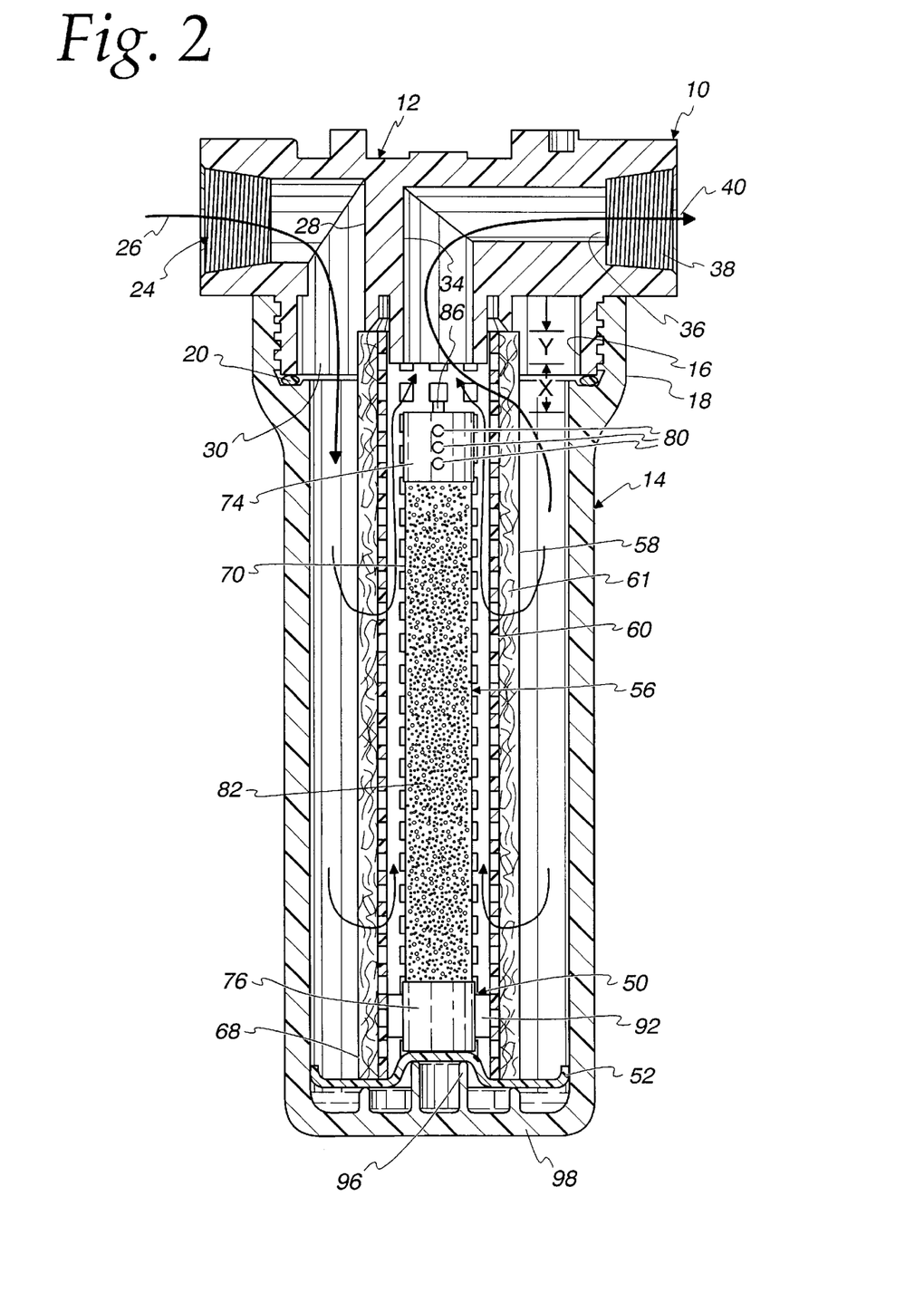
FIG. 2 is a cross-sectional view taken along the lines 2—2 of FIG. 1.

Referring to FIG. 2, the dispense head 12 is preferably of monolithic molded plastic design. An inlet 24, preferably threaded, accepts a pressurized fluid flow indicated by the arrow 26. Incoming flow is diverted by internal wall 28 through a flow entry means or opening 30 into the interior of the canister 14. The incoming flow fills the entire interior of canister 14 and eventually exits through a flow exit means in the form of a stub portion or projection 34, through outlet passageway 36 and eventually to threaded outlet opening 38, as indicated by arrow 40. As can be seen in FIG. 2, the projection 34 comprises a stub-like nipple projecting slightly beyond the bottom wall of dispense head 12 into the hollow cavity of canister 14.

Dispense head 12 can take on configurations other than that illustrated in the figures. For example, in the preferred embodiment, the configuration of internal wall 28 and inlet opening 30 are provided as a matter of manufacturing convenience in accordance with cost efficient plastic molding techniques. One advantage of the present invention is that, when the chemical container assembly is employed with dispense heads of the pre-filter type, spacing tolerances between the outlet of the chemical container assembly and the head are generally less critical than with head designs generating a venturi flow effect. Thus, the present invention can be employed with existing pre-filter housings to provide a retrofit upgrade which adds chemical treatment to the fluid being processed. Further benefits are enjoyed by the present invention in that maintenance operations, oftentimes carried out by an untrained store operator, are carried out in a familiar manner, similar to that of replacing a filter element. With the present invention, metering accuracies previously associated with venturi-type dispensing heads can now be enjoyed with dispensing heads of a simplified pre-filter type.

Figure 3:
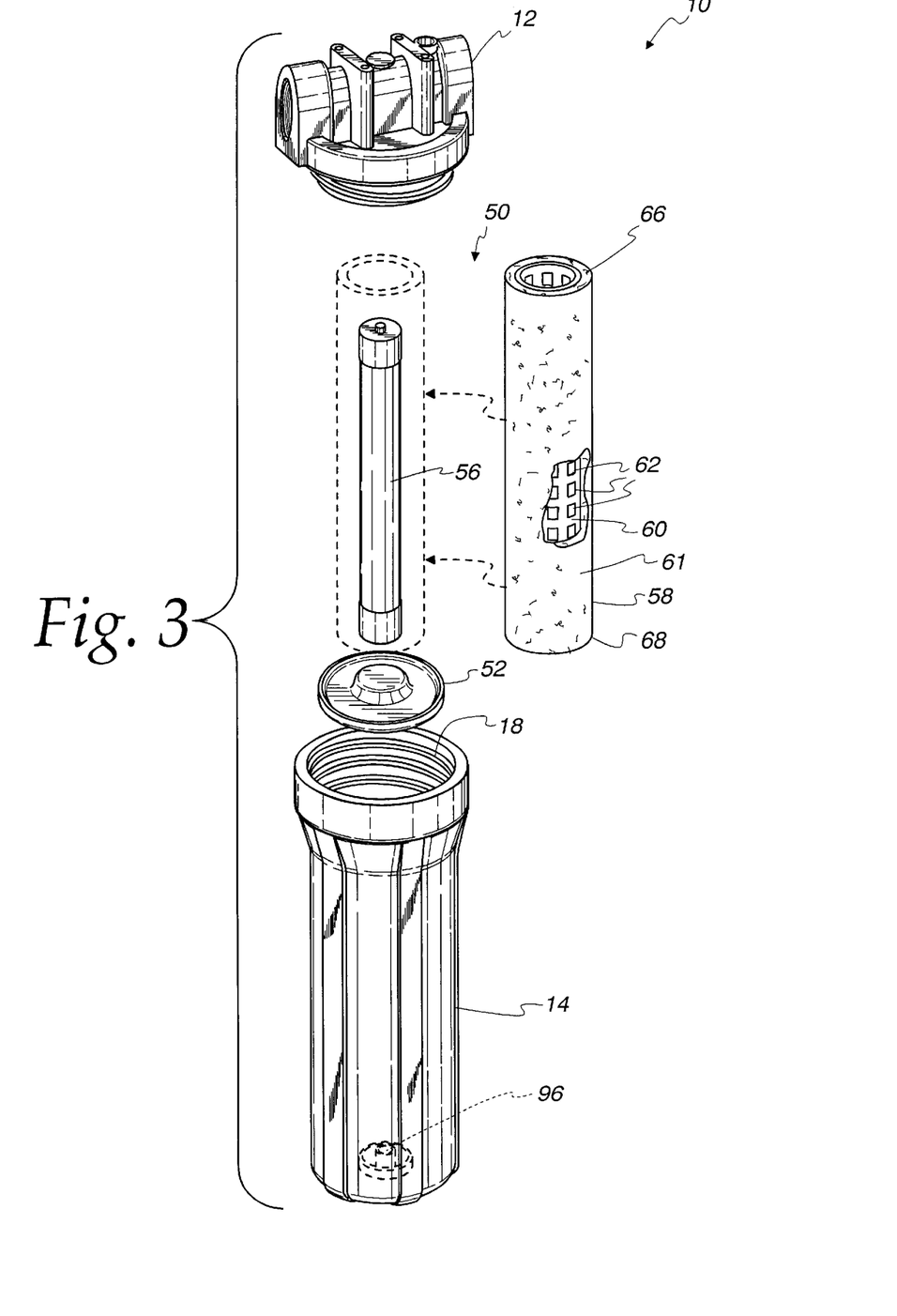
FIG. 3 is an exploded perspective view thereof.

Referring briefly to FIG. 3, the assembly of dispensing device 10 is preferably completed with the introduction of a chemical container assembly generally indicated at 50 having an optional mounting cup 52, preferably formed of a monolithic elastomeric material. With additional reference to FIG. 2, the chemical container assembly 50 includes a chemical container 56 telescopically disposed within a pretreatment stage 58, which is omitted in FIG. 1 for clarity of illustration. As can be seen for example in FIG. 3, the pretreatment stage 58 preferably comprises a foraminous cylindrical support tube 60 having a grid-like array of rectangular openings 62.

A foraminous outer pretreatment sleeve 61 is fitted about support tube 60. It is generally preferred that physical support for the sleeve be provided outside of the sleeve so as to allow the sleeve to be optimized for water treatment and water flow conditions. The sleeve 61 may take a variety of conventional forms, including a foraminous cylinder of activated pretreatment chemical such as an ion exchange resin, for removing iron or other contaminants. Preferably, the outer pretreatment sleeve includes charcoal in granular form, usually encased in a foraminous plastic shell; charcoal in compressed, block form; and charcoal in a composition form comprising a matrix of charcoal and support fibers. A charcoal sleeve in composition form is most preferred since it does not experience plugging as with charcoal in block form and is more resistant to channeling over time than charcoal in encapsulated granular form. The charcoal is friable and even in compressed block form is readily frangible. In whatever form employed, the charcoal sleeve typically has an outer foraminous covering which provides containment of the charcoal contained within. Typically, the charcoal sleeve is not strong enough to be self-supporting or to withstand pressure pulses and other forces experienced during operation of the chemical dispenser.

As indicated in FIG. 3, the pretreatment stage 58 is of uniform construction, from its upper end 66 to its lower end 68. The support tube is hollow so as to telescopically receive the chemical container 56 at its upper end, as well as a central portion of the optional mounting cup 52 at its lower end. The pretreatment stage 58 allows fluid to contact the chemical container assembly disposed therein, and especially the treatment chemical portion thereof. Further, the pretreatment stage is made to have an adequate porosity to allow a sufficient fluid flow pressure to be exerted upon the treatment chemical so as to dissolve a portion of the treatment chemical, and entrain the dissolved portion in the fluid flow.

The porous properties of the support tube can be provided in different conventional ways. For example, the support tube could have an expanded construction similar to that of a rigid expanded foam. Alternatively, the support tube could have a compressed fiber composition such as a mat rolled into a tube and fortified with a suitable stiffener agent. In the preferred embodiment, as mentioned, the support tube 60 has a rigid uniform grid-like array throughout, which is preferably provided by a plastic molding operation, or by a metal screen or fabric. It is generally preferred that the support tube, whatever its construction, allows a sufficient flow pressure to act upon the treatment chemical, as indicated.

Preferably, the chemical container 56 includes an impervious hollow tubular plastic body 70 enclosed at its upper and lower ends by end caps 74, 76, respectively. The upper end cap 74 has one or more holes 80 formed therein. In the preferred embodiment, a linear series of three holes 80 are formed in the upper end cap 74 and extend through the underlying portion of tubular body 70, as well. Preferably, the holes 80 are aligned generally parallel to a central axis of the chemical container. Holes 80 allow introduction of fluids passing through pretreatment assembly 58 to enter the interior of tubular body 70, so as to contact the treatment chemical 82. Preferably, the treatment chemical comprises a solid cake but may also take the form of a loose or compressed powder, a molded solid, or a gel, for example.

In the preferred embodiment, the dispensing device 10 is employed for the treatment of water supplies with the chemical agent comprising a cake of polyphosphate material. The treatment chemical 82 is dissolved by water filling the interior of canister 14 and entering the chemical container through holes 80. The dissolved treatment chemical passes through an outlet hole 86 formed in the end of cap 74, so as to combine with the outlet fluid flow indicated by arrow 40. An outlet nozzle or jet may be mounted in the hole 86 in upper end cap 74, although this has not been found to be necessary.

The chemical container 56 is preferably fitted within support tube 60, such that the upper end of the chemical container is located at a controlled distance from the upper end of pretreatment stage 58, thereby fixing the distance x between the lower free end of protrusion 34 and outlet hole 86, as indicated in FIG. 2. Preferably, the chemical container is dimensioned slightly smaller than the support tube so as to be easily slid within pretreatment stage 58. When the chemical container is positioned in a desired manner, is fixed to the pretreatment stage 58 by adhesive 92. In the preferred embodiment adhesive 92 comprises a hot melt type of adhesive, employed to prevent the longitudinal or telescopic misalignment of the chemical container which may be located virtually anywhere along the length of the support tube, for this purpose. If desired, adhesive 92 may be located only toward the bottom of the chemical container assembly at a point remote from the holes 80 and orifice 86 to avoid interference with flow patterns adjacent the metering regions.

Figure 5:
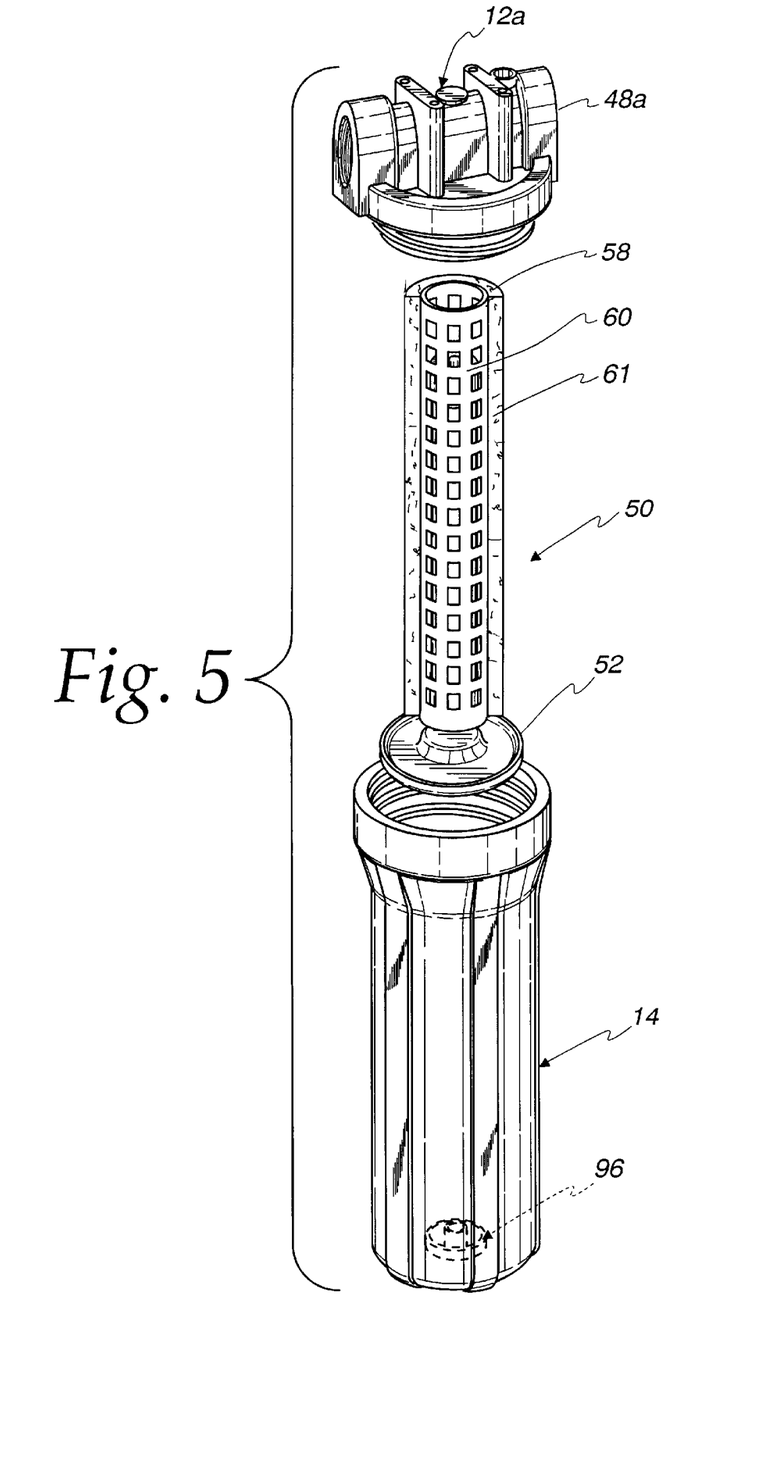
FIG. 5 is a cross-sectional view of a different embodiment according to the principles of the present invention.

The present invention can provide flow regulation for dispensing devices which are pressure-induced, as well as those relying on the suction effects of venturi flow. As that shown in FIG. 5, a chemical treatment assembly 50 is used with a known venturi-type cap 48 disclosed in commonly assigned U.S. Pat. No. 5,507,945, which is herein incorporated by reference. In FIG. 5, the chemical treatment assembly 50 is shown cut away, to reveal foraminous support tube 60.

Figure 6A:
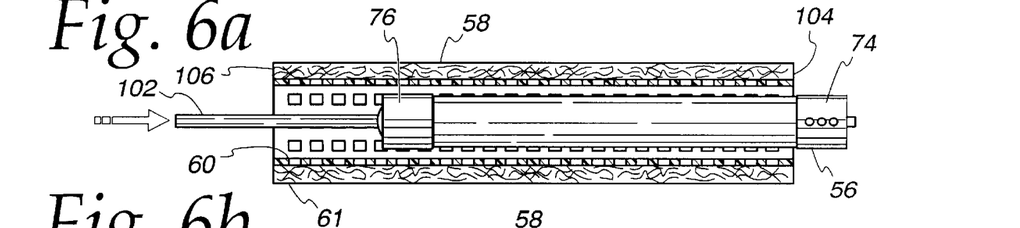
FIGS. 6a–6e show a sequence of assembly steps therefor.

Referring now to FIGS. 6a–6e, one example of a method of assembling the chemical container assembly 50 will be described. In FIG. 6a, the chemical container 56 is inserted within pretreatment stage 58, in the direction indicated by arrow 102. Preferably, the chemical container 56 is "overinserted" a considerable amount, beyond that required for the final positioning of the chemical container within the pretreatment stage. For example, as indicated in FIG. 6a, the upper end cap 74 is temporarily positioned adjacent the upper free end 104 of the pretreatment stage. As indicated in FIG. 6a, the bottom end cap 76 is spaced a substantial distance from the bottom end 106 of the pretreatment stage.

Figure 6B:
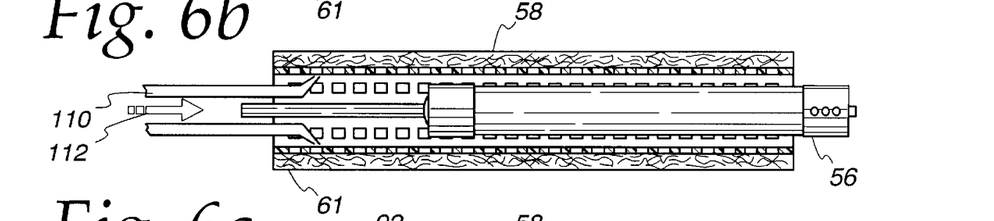
Figure 6C:
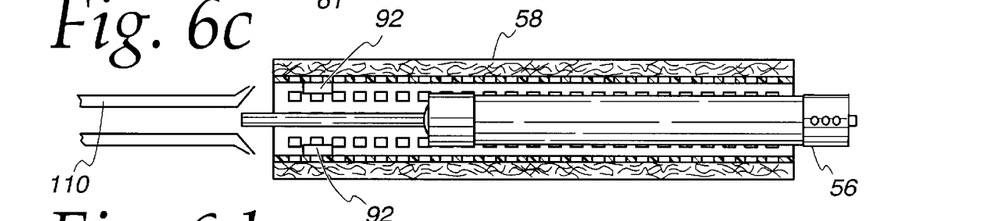
Figure 6D:
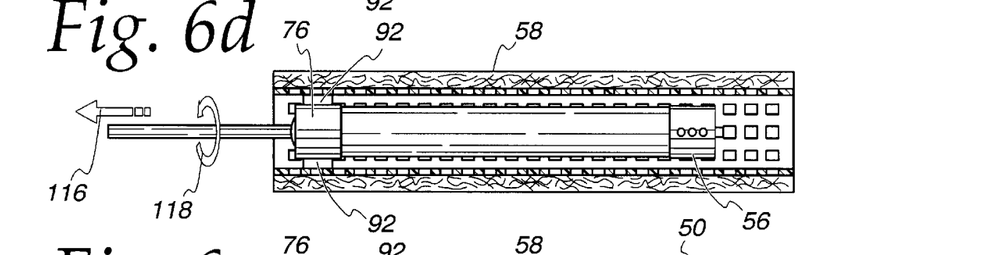
Figure 6E:
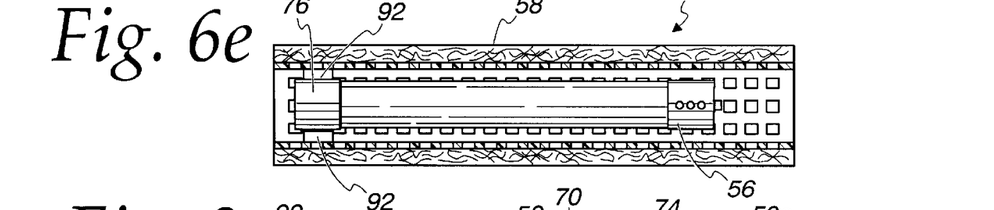

As shown in FIG. 6b, hot melt adhesive injectors 110 are removed within the pretreatment stage 58 as indicated by arrow 112. Referring to FIG. 6c, after depositing adhesive 92, injectors 110 are withdrawn. As indicated by arrows 116, 118, the chemical container 56 is withdrawn so as to contact adhesive 92 with its lower end cap 76. The chemical container 56 may, optically, be rotated as indicated by arrow 118 to further spread adhesive 92 about end cap 76, as the chemical container is moved to its final position indicated in FIG. 6e.

Figure 7:
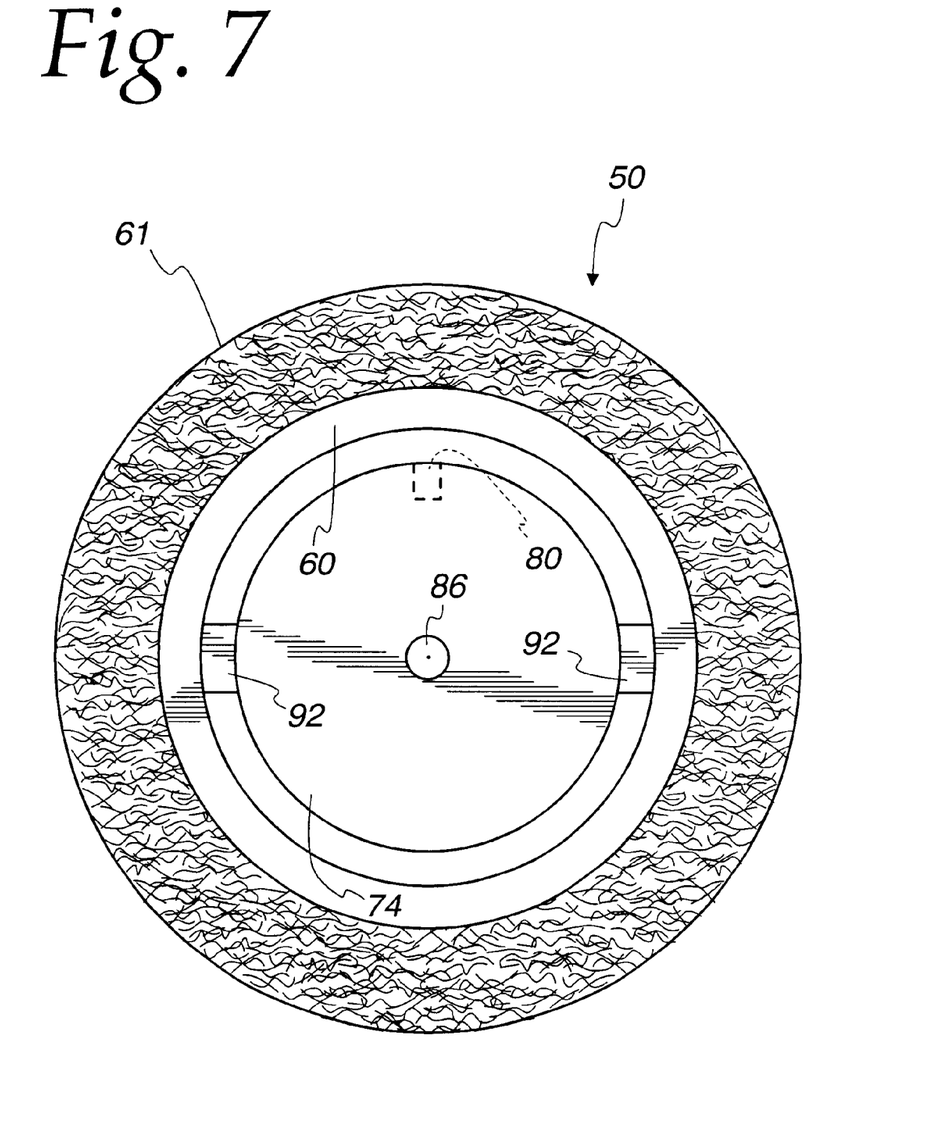
FIG. 7 is an end view of the completed assembly.
Figure 8:
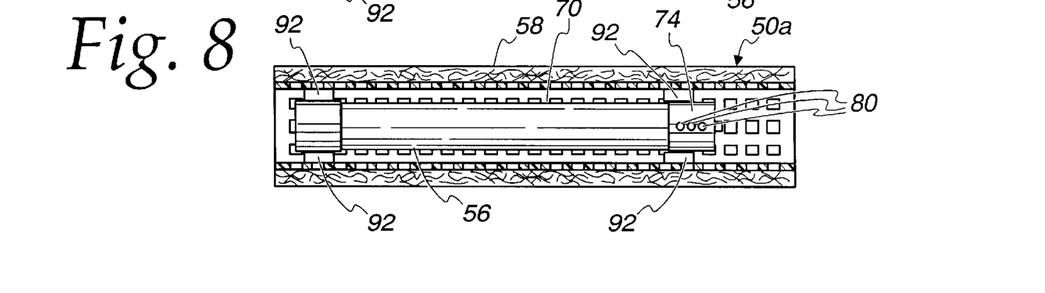
FIG. 8 is cross-sectional view showing an alternative embodiment of a chemical container assembly.

As indicated above, a single actuator is employed, adjacent the bottom end cap 76 applying both a compressive and a tensile force to the bottom end cap during fabrication of chemical container assembly 50. It is preferred, for this reason, that the actuator be provided with conventional means for imparting a suction grip to the bottom end cap 76. Alternatively, a second actuator can be applied to the upper end cap 74. As indicated in FIG. 7, an optional chemical container assembly 50a is provided with adhesive 92 adjacent the upper end cap 74. If desired, adhesive could be applied to tubular body 70, although this has not been found to be necessary since, in the preferred embodiment, the holds 80 formed in upper end cap 74 are displaced 90 degrees with respect to discrete points of adhesive 92 adhering to the upper end cap 74.

Figure 1:
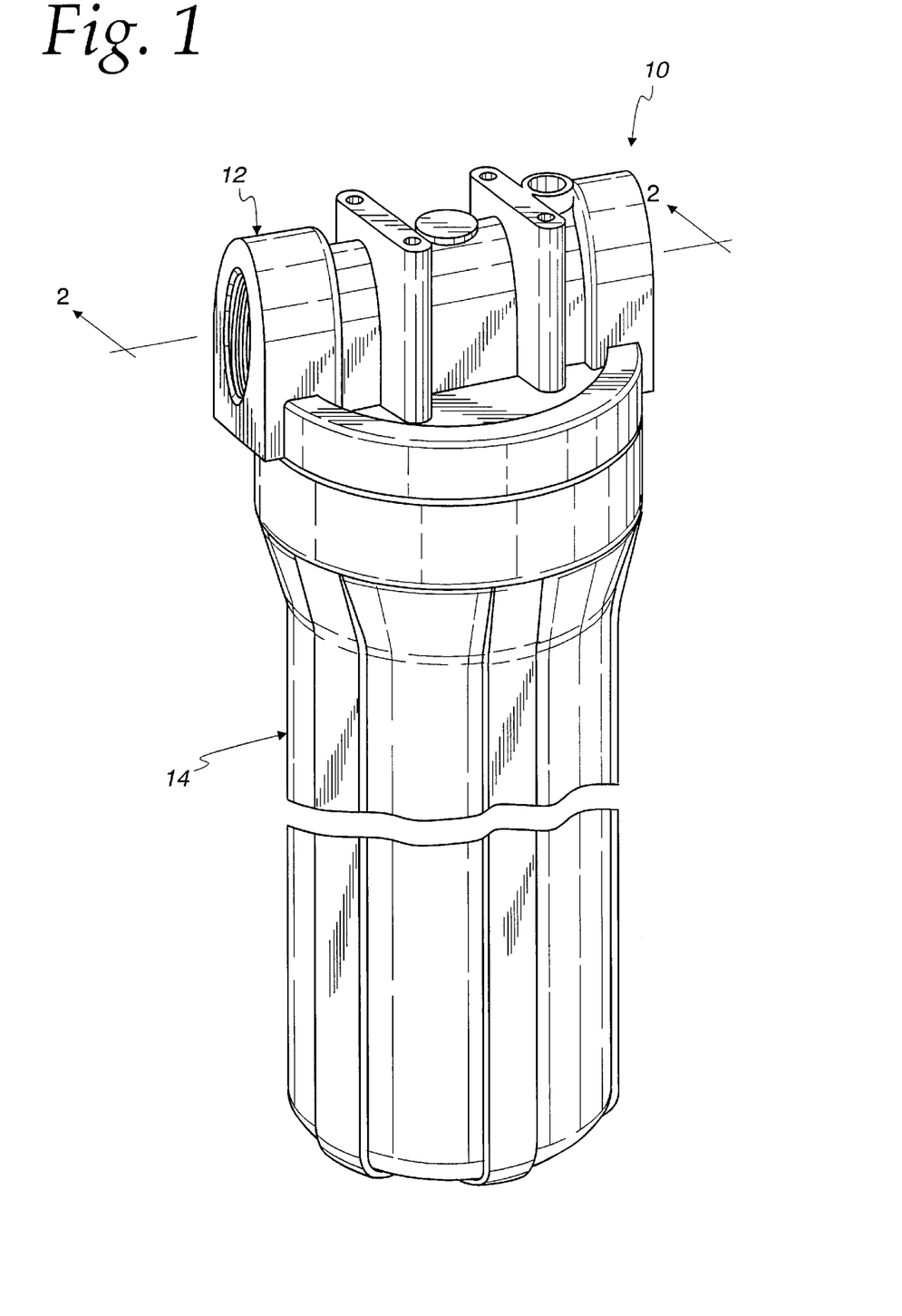
FIG. 1 is a perspective view of chemical dispensing apparatus of the present invention.
Figure 4:
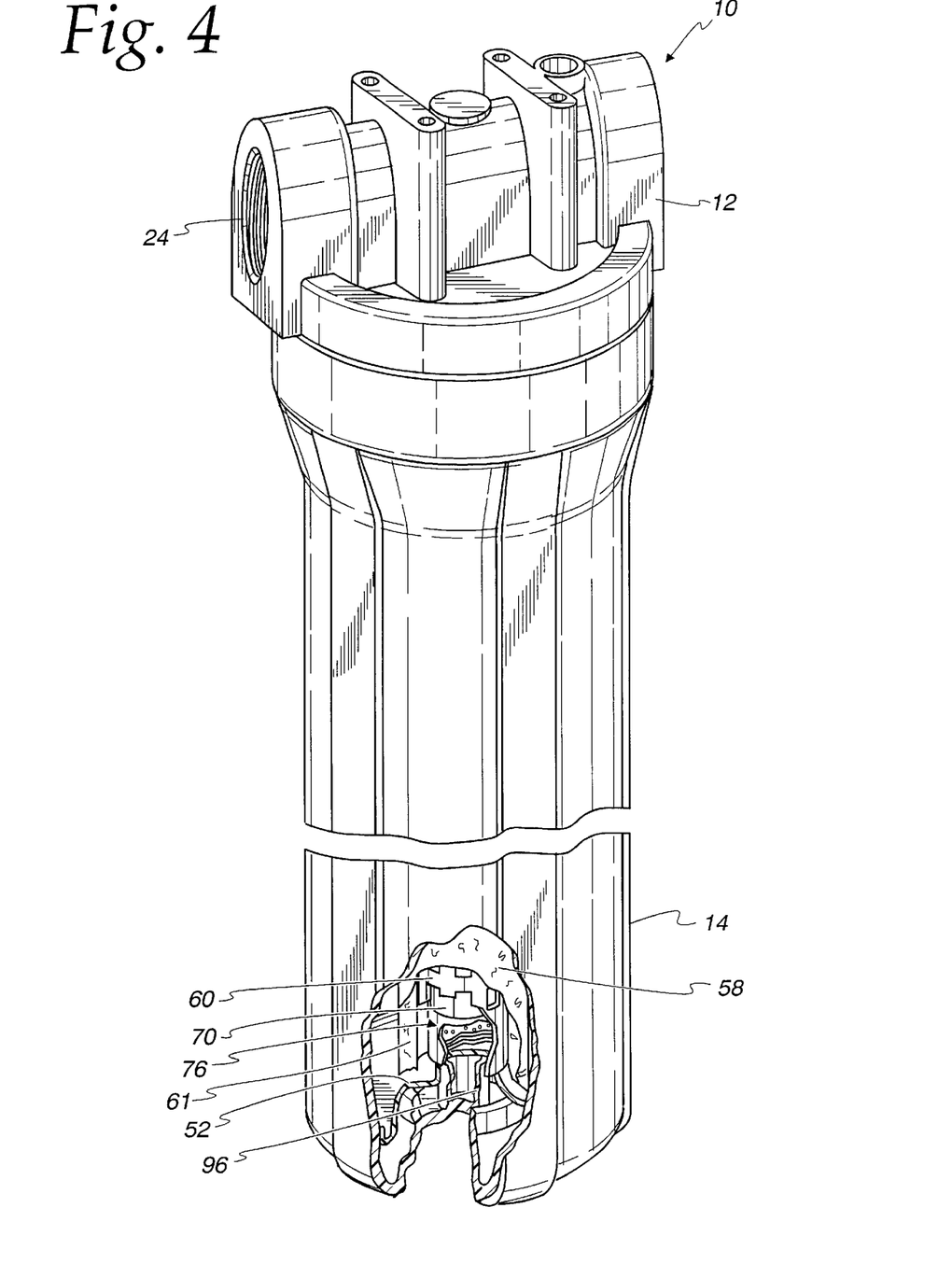
FIG. 4 is a perspective view of the completed assembly, shown partially broken away.

As can be seen at the bottom of FIGS. 1, 3 and 4, for example, canister 14 is provided with an upstanding alignment post 96. Post 96 extends into the interior of the container cavity to help orient the bottom of the chemical container assembly. In the preferred embodiment, mounting cup 52 is employed with a central upraised portion which is both telescopically fittable over post 96 as well as telescopically insertable within pretreatment stage 58. In FIG. 2, the separation distance between mounting cup 52 and the bottom of canister 14 is exaggerated for drawing clarity. Preferably, however, the bottom end 68 of pretreatment stage 58 is raised a slight distance above the bottom end wall 98 of canister 14, with the intervening elastomeric mounting cup 52 providing a spring bias or cushioning against water hammer or other forces applied to the chemical container assembly.

As mentioned, mounting cup 52 is optional and may be omitted if desired. It is generally preferred in this instance that the bottom end of chemical container 56 be recessed from the bottom end of support column 50 such that, with the bottom end of support column 50 engaging the bottom wall 98 of canister 14, the bottom end of chemical container 56 is spaced from post 96. As a further alternative, the chemical container and dispense head may be applied to a canister having a relatively featureless bottom wall, with post 96 being omitted. If the canister is dimensioned so as to be substantially larger than the support column, mounting cup 52 can be provided for aligning the central axis of chemical container 56 with central axis of canister. If desired, the mounting cup 52 can also be made to have a thickness and resilience sufficient to cushion the support column and hence the chemical container, if desired.

As indicated in FIG. 2, a portion of the upper end of pretreatment stage 58 is telescopically inserted over downward projection 34. This helps orient the upper end of the chemical container assembly with respect to the dispense head 12. Additionally, a further advantage is gained in the assembly of the dispensing device by securing the mounting cup 52 to pretreatment stage 58 with adhesive (not shown), either prior to or subsequent to the chemical container being affixed to the support tube with adhesive 92. The resulting chemical canister assembly may then be fitted to the canister 14, relying upon the mounting cup to align with post 96. The dispense head 12 is then threadingly engaged with the upper end of canister 14 as the upper end of pretreatment stage 58 is telescoped with respect to downward projection 34. These features, it is believed, will aid unskilled operators, unfamiliar with the assembly procedure, to maintain alignment of the support tube as container 14 is threadingly engaged with the dispense head. During the assembly operation, the rigid pretreatment stage 58 may be telescopically interfitted with the downward projection 34.

With the present invention, the features important to metering accuracy, and especially the inlet and outlet holes 80, 86, are exposed for easier fabrication and quality assurance inspections. With access through the upper end of the pretreatment stage, last minute changes, such as tailoring an output hole size for a particular dispense head design, can be readily made on demand, prior to final assembly of the dispense device. As can be seen for example in FIG. 2, the chemical container is inserted within the support tube so as to have recessed portions at the top and bottom ends. The amount of recess at the upper end allows for the assured proper spacing x while the recess at the bottom end allows the fitting of mounting cup 52. If desired, the amount of recess can be chosen so as to accommodate a coil spring (preferably plastic) or a bellows-type rubber spring between the bottom of the chemical container and the bottom wall 98. If desired, the mounting cup 52 can be omitted in place of the optional spring bias elements and the projection 96 at bottom wall 98 can be omitted, if desired.

As mentioned above, it is generally preferred that the pretreatment stage 58 be of uniform construction throughout its length and be continuously spaced from the charcoal container. Thus, the amount of telescoping overlap between the pretreatment stage 58 and the inlet projection 34 can be adjusted without concern for reducing the effective flow opening area within the separation distance x. Because of the rigidity of the support tube of the pretreatment stage 58 and the ability to define a fixed accurate length, possible shifts of the chemical container assembly due, for example, to extreme water hammer effects, can be accommodated by the discharge device with suitable engagement of the support tube and centering post 96 being assured.

As mentioned above, it is generally preferred that the support column 58 be of uniform construction throughout. Thus, the amount of telescoping overlap between the support column 58 and the inlet projection 34 can be adjusted without concern for reducing the effective flow opening area within the separation distance x. Because of the rigidity of the support column 58 and the ability to define a fixed accurate length, possible shifts of the chemical container assembly due, for example, to extreme water hammer effects, can be accommodated by the discharge device with suitable engagement of the support tube and centering post 96 being assured.

As mentioned above, the chemical container assembly can, with the present invention, be made in a range of sizes to accommodate different quantities of a known material as well as accommodating treatment chemicals which may be determined in the future. Different types of chemicals may require a greater or lesser volume in order to treat a given amount of source fluid. If necessary, the diameter or length of the chemical container assembly can be adjusted as required without a significant re-design of the dispensing device.

Figure 9:
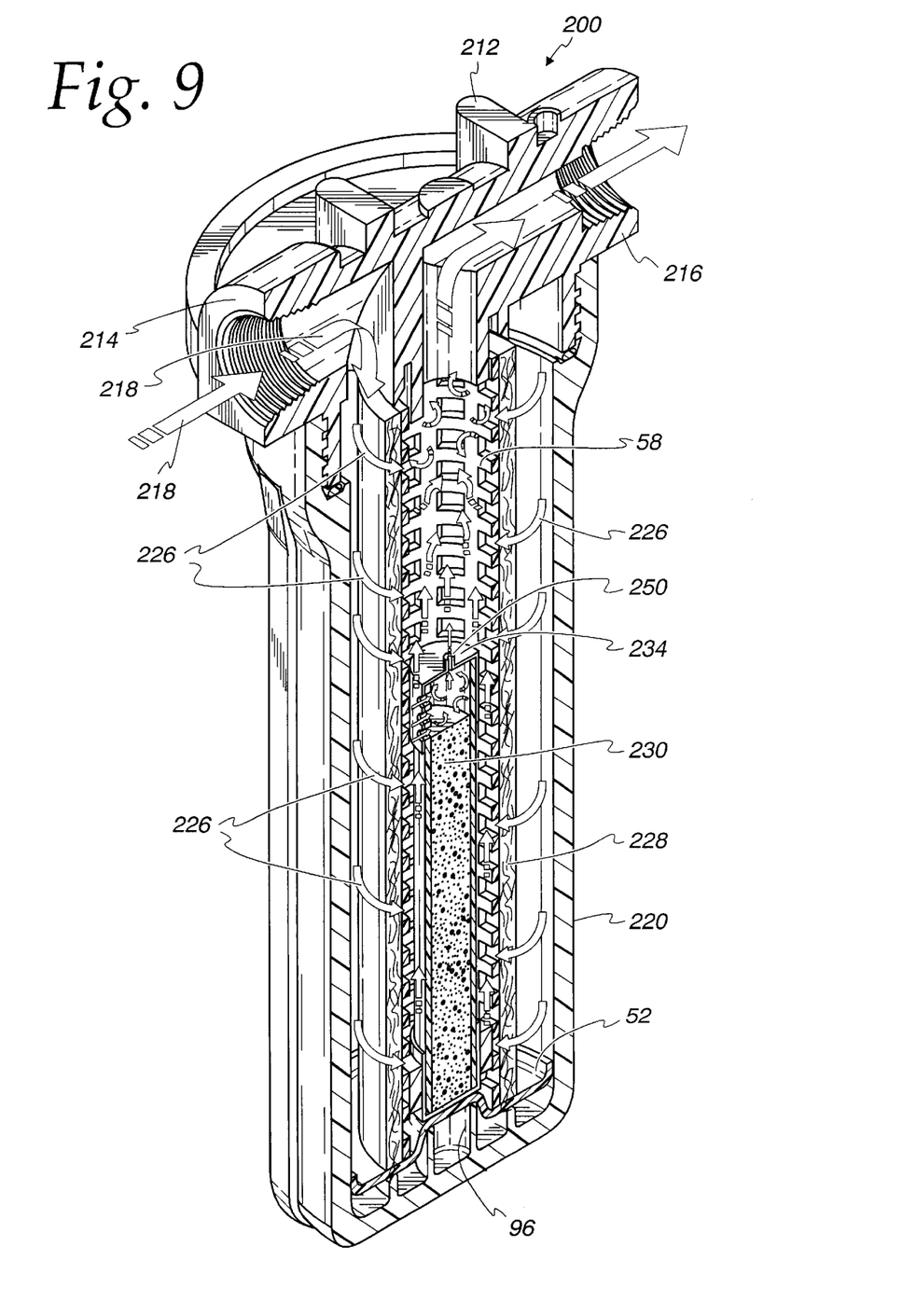
FIG. 9 is a cross-sectional view of a further embodiment of a dispensing device according to principles of the present invention.
Figure 10:
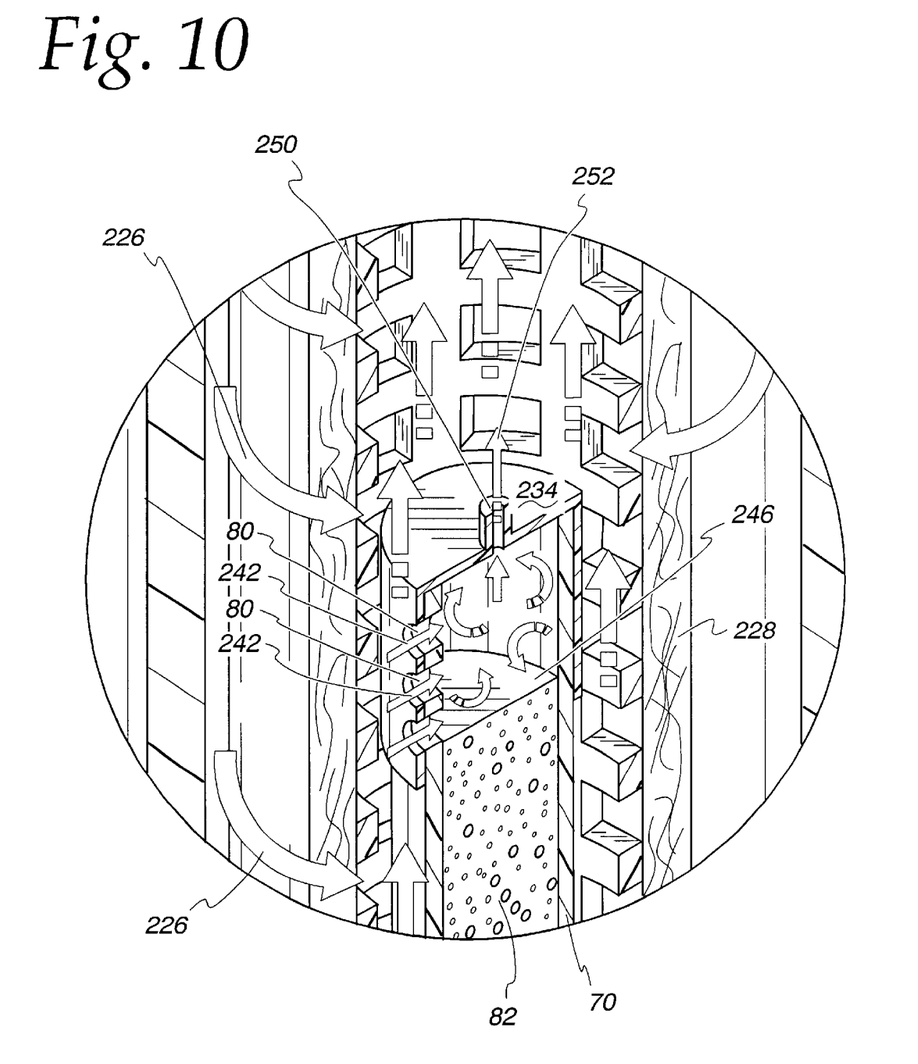
FIG. 10 is an enlarged fragmentary view of FIG. 9.

Turning now to FIGS. 9 and 10, an alternative embodiment of a chemical container assembly according to principles of the present invention is generally indicated at 200. The dispensing device includes a dispense head 212 having inlet and outlet connections 214, 216, respectively. As indicated by arrows 218, fluid flow enters inlet fitting 214 and is deflected in a downward direction generally parallel to the longitudinal axis of canister 220 which is sealingly threaded to dispense head 212. As indicated by arrows 226, incoming flow 226 travels to the center of the dispensing device passing through outer treatment sleeve 228 and foraminous support column 58. The outer treatment sleeve 228 can comprise any of a number of commercially available foraminous treatment materials, including materials used for a filtration type of treatment. The outer treatment sleeve 228 can comprise, for example, an activated charcoal filter layer of either the cake, granular or fiber matrix type. Alternatively, the outer treatment sleeve can comprise a chemically active agent in a compressed, porous form or a chemically active agent which is bonded to a fibrous web for structural support. If desired, the foraminous pretreatment sleeve could also comprise a synthetic sponge material, as well as multiple layers of a wrapped paper or plastic sheet material.

A chemical container assembly 230 is substantially identical to the chemical container assembly 50 described above, except that the length of the assembly has been shortened such that the upper end cap 234 is spaced a substantial distance below the stub portion or projection 34. As indicated in the enlarged view of FIG. 10, treatment chemical 82 has a shortened length compared to tubular plastic body 70, leaving a mixing chamber formed at the upper end of the tubular plastic body, enclosed by the upper end cap 234. As indicated by arrows 242, a portion of the incoming fluid flow enters the mixing chamber through holes 80. As schematically indicated by the curved arrows within the mixing chamber, the incoming fluid contacts the upper surface 246 of treatment chemical 82, mixing with that portion of the treatment chemical which is dissolved at surface 246. The chemical mixture then passes through orifice 250 associated with upper end cap 234 and passes through the orifice as indicated by arrow 252. Orifice 250 can comprise a conventional orifice or jet fitting or, alternatively, could simply comprise a hole formed in upper end cap 234. Dissolved chemical exiting the chemical container assembly quickly mixes with incoming fluid 226 becoming diluted to a desired concentration before passing through stub portion 34 and outlet 216 of dispense head 212.

When a reduced quantity of treatment chemical is desired, it is generally preferred that the chemical container assembly be shortened and installed toward the bottom end of the dispensing device. This preferred location of the shortened chemical container assembly removes the internal mixing chamber from the vicinity of projection 34, providing a measure of isolation or buffer from water hammer or the like sudden pulses transmitted to the interior of canister 220. Further, any unusually turbulent or erratic flow entering canister 220 from the inlet end will have its greatest effects adjacent projection 34. Because of the physical spacing of the mixing chamber (internal to the chemical container assembly) and projection 34, water hammer and other pressure surges will be diminished at the point where fluid flow enters the chemical container assembly through holes 80. Further, the concentrated mixture of dissolved chemical exiting the chemical container assembly will have a longer residence time for mixing before passing through projection 34 so as to level out any short term excursions of chemical concentration.

In the preferred embodiment as illustrated, no changes need be made to the dispensing device other than to size the length of the chemical container assembly, as required. In the preferred manner of construction, as indicated above, adjusting the length of the chemical container assembly requires only that the length of the plastic body 70 be adjusted, prior to introduction of the treatment chemical and the fitting of the upper and lower end caps. With the present invention, the manufacture of dispensing devices can accommodate different types of treatment chemicals requiring different quantities of chemicals installed for a particular application can be readily provided by relatively simple and inexpensive adjustments to the manufacturing process for the chemical container assembly.

The present invention provides further advantages for fluid treatment having multiple modes of fluid treatment. For example, pre-filter sleeves can be fitted about the support column 58 if the pre-filter construction is self-supporting. If the pre-filter is not self-supporting, the support column 58 can provide a convenient point of attachment to support the height of the pre-filter. Such additional support offered by column 58 can be important for outer sleeves which are subject to deterioration caused by flow surge effects within the dispense device.

The drawings and the foregoing descriptions are not intended to represent the only forms of the invention in regard to the details of its construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation, the scope of the invention being delineated by the following claims.

What is claimed is:

1. A dispensing device for dispensing a chemical agent into a fluid flow, comprising:

a dispense head having inlet and outlet means for coupling to said fluid flow and defining a flow passageway coupling said inlet and said outlet means;

a canister engageable with said dispense head and defining a hollow interior cavity;

said flow passageway in said dispense head including flow entry means for directing fluid flow into said hollow interior cavity and flow exit means for directing fluid flow out of said hollow interior cavity;

a chemical container assembly within said hollow interior cavity in contact with the fluid flow;

said chemical container assembly including a foraminous pretreatment sleeve, a rigid, hollow, foraminous support tube within each foraminous pretreatment sleeve and extending to said flow exit means, and a cylindrical chemical container disposed in said support tube so as to be held by said support tube a predetermined spaced distance from said flow exit means;

said support tube comprising a rigid tube having a continuous array of similarly sized openings formed therein;

said chemical container assembly defining inlet and outlet holes adjacent its upper end and including an outer cylindrical wall enclosed by upper and lower end walls, with said outer cylindrical wall defining a plurality of said inlet holes formed in a linear array, generally parallel to a central axis of said chemical container and wherein said upper end wall defines said outlet hole; and said flow exit means comprises a stub portion of said dispense head projecting into said hollow interior cavity so as to be at least partly received in the upper end of said support tube in overlapping relation therewith.

2. The dispensing device of claim 1 wherein said canister includes an alignment post projecting into said hollow interior cavity so as to be at least partly received in the lower end of said support tube in overlapping relation therewith.

3. The dispensing device of claim 2 wherein said chemical container assembly further includes a mounting cup of elastomeric material, having a central portion covering said alignment post so as to be received in the lower end of said support tube in overlapping relation therewith.

4. The dispensing device of claim 3 further comprising adhesive joining said mounting cup to said support tube.

5. The dispensing device of claim 1 wherein said chemical container includes an impervious tubular plastic body which is spaced from said support tube.

6. The dispensing device of claim 5 further comprising adhesive fixing said chemical container in spaced relation to said support tube.

7. The dispensing device of claim 6 wherein said adhesive joins the bottom end of said chemical container to said support tube.

8. The dispensing device of claim 1 wherein said foraminous pretreatment sleeve contains charcoal in granular form.

9. The dispensing device of claim 8 wherein said foraminous pretreatment sleeve contains charcoal in compressed, block form.

10. The dispensing device of claim 1 wherein said foraminous pretreatment sleeve contains a matrix of charcoal and fibers.

\* \* \* \* \*